United States Patent
Tsang et al.

(10) Patent No.: US 11,847,435 B2
(45) Date of Patent: Dec. 19, 2023

(54) FEEDBACK-DIRECTED PASS PIPELINE OPTIMIZATION IN STATIC COMPILATION

(71) Applicant: INTERNATIONAL BUSINESS MACHINES CORPORATION, Armonk, NY (US)

(72) Inventors: Wai Hung Tsang, Markham (CA); Jinsong Ji, Ponte Vedra, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 17/645,284

(22) Filed: Dec. 20, 2021

(65) Prior Publication Data
US 2023/0195437 A1    Jun. 22, 2023

(51) Int. Cl.
G06F 8/41    (2018.01)

(52) U.S. Cl.
CPC .................................. G06F 8/443 (2013.01)

(58) Field of Classification Search
None
See application file for complete search history.

(56) References Cited

U.S. PATENT DOCUMENTS

| | | |
|---|---|---|
| 9,547,483 B1 | 1/2017 | Boxall et al. |
| 9,552,193 B2 * | 1/2017 | McEwan .................. G06F 8/443 |
| 2007/0226698 A1 | 9/2007 | Cascaval et al. |
| 2016/0085528 A1 | 3/2016 | Kalogeropulos et al. |
| 2017/0017472 A1 * | 1/2017 | He .......................... G06F 8/4441 |
| 2017/0344350 A1 * | 11/2017 | Kalogeropulos ....... G06F 8/427 |
| 2017/0351499 A1 * | 12/2017 | Ji ............................. G06F 8/443 |
| 2018/0052668 A1 * | 2/2018 | Ishii .......................... G06F 8/54 |
| 2018/0157470 A1 * | 6/2018 | Matsuura .................. G06F 8/30 |
| 2020/0293295 A1 * | 9/2020 | Gao ........................ G06N 20/00 |
| 2021/0019857 A1 | 1/2021 | Ray et al. |
| 2021/0389954 A1 | 12/2021 | Sommers et al. |
| 2022/0214866 A1 * | 7/2022 | Li ........................... G06F 8/443 |

FOREIGN PATENT DOCUMENTS

| | | |
|---|---|---|
| CN | 112352219 A | 2/2021 |
| CN | 112527300 A | 3/2021 |
| WO | 2021107765 A1 | 6/2021 |

OTHER PUBLICATIONS

Haj-Ali et al., "CS294-112 & CS262A Project Report Autophasing: Learning to Optimize Compiler Passes with Deep Reinforcement Learning", UC Berkeley, (pp. 13).

* cited by examiner

*Primary Examiner* — Ryan D. Coyer
(74) *Attorney, Agent, or Firm* — Griffiths & Seaton PLLC (57) ABSTRACT

Feedback-directed pass pipeline optimization in static compilation includes receiving a set of source input of source code by a static compiler. The static compiler initiates a compilation operation on the source code in which, in a pass pipeline during the compilation operation that creates an intermediate representation (IR) representing the source code, a set of optimization diagnostics identified during a first pass of the pass pipeline is emitted into a side file. The pass pipeline is then optimized using the set of optimization diagnostics.

20 Claims, 8 Drawing Sheets

```
1    #define N 100
2
3    f1.cpp:
4    int bar() {
5            return <code B>;
6    }
7
8    int foo(long i) {
9            if (i % 2)
10                   return bar();
11           return <code A>;
12   }
13
14   f2.cpp:
15   extern int bar();
16   extern int foo(long i);
17
18   int main() {
19           int x = 0;
20           for (long i = 0; i < N; ++i)
21                   x += foo(i)
22           return x;
23   }
```

FEEDBACK-DIRECTED PASS PIPELINE OPTIMIZATION IN STATIC COMPILATION

BACKGROUND OF THE INVENTION

Field of the Invention

The present invention relates in general to computing systems, and more particularly, to various embodiments for optimizing pass pipelines in static compilation using dynamic pass feedback.

Description of the Related Art

A compiler is a specialized computer program that converts source code written in one programming language into another language, usually machine language (also called machine code), so that it can be understood by processors (i.e., logic chips). Source code is the version of software (usually an application program or an operating system) as it is originally written (i.e., typed into a computer) by a human in plain text (i.e., human readable alphanumeric characters). Source code can be written in any of numerous programming languages, some of the most popular of which are C, C++, Java, Perl, PHP, Python and Tcl/Tk. The output of a compiler is generally referred to as object code, which in turn may then be linked into a complete program or library file.

During compilation and/or linking of the source code, the compiler and/or linker may implement optimization techniques using a sequence (pipeline) of optimizing transformations (passes) on the code. However, and particularly in static compilation, compilers generally define fixed pipelines for different optimization levels. One example of these optimization techniques is link time optimization (LTO), in which optimization of the program is performed during linking with a view of the entire view of the program using an intermediate representation (IR) data structure representing the source code.

SUMMARY OF THE INVENTION

Various computer-implemented embodiments for feedback-directed pass pipeline optimization in static compilation are provided. One embodiment includes receiving a set of source input of source code by a static compiler. The static compiler initiates a compilation operation on the source code in which, in a pass pipeline during the compilation operation that creates an IR representing the source code, a set of optimization diagnostics identified during a first pass of the pass pipeline is emitted into a side file. The pass pipeline is then optimized using the set of optimization diagnostics.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, compilers translate high-level source code (e.g., C++) which is developed by and readable by human beings, into a low-level machine code. This low-level machine code, also commonly known as object code, is a set of instructions that a computer is able to understand and consequently implement. This translation process is known as compilation. Object code is often referred to as executable or execution code when it is run, producing whatever intended functionality of the original programmers.

This compilation process in the past resulted in executable code that was not as efficient as it possibly could be. Over time, various means of optimizing the executable code, based on general observations of the high level code and any other intermediate versions of the code generated during compilation (i.e., an IR), as well as other time-tested improvements have resulted in greatly improved and more efficient object code, consequently delivering better software performance.

Compiler optimization is generally implemented using a sequence (pipeline) of optimizing transformations (passes) on the source code. However, particularly in static compilation, static compilers (and/or linkers) generally define fixed pipelines for different optimization levels, which inherently limits any transparency and flexibility as to what optimizations are able to be performed using information gleaned from the fixed passes. For example, consider the following scenario.

Most loop transformations in any optimizer require a given loop to be in a certain canonical form. In LLVM®, multiple canonical forms are defined, namely loop simplify form, loop closed static single assignment (SSA) form, and rotated form. There is a corresponding loop transformation to translate loops into each of the canonical forms when possible, however, there is no guarantee that a canonical form will remain after being successfully transformed into that canonical form. This is because other transformations performed after translating the loops in the canonical form can modify the loop causing the loop to break the canonical form.

For example, a Simplify Control Flow Graph (CFG) pass will remove empty basic blocks. One of the removed empty basic blocks can be a loop preheader, which is required for loop simplify form. Depending on the implementation of a loop transformation, a combination of those canonical forms may be required, and when a required canonical form is not satisfied, the optimization is unable to be performed. This issue may be solved were the compiler able to re-order passes to insert the corresponding passes that form the missing required canonical forms prior to the pass that requires them, however the present state of the art precludes such an operation because of the nature of the fixed pipeline. Application/program performance tuning typically manually devises customized pass pipelines, however this requires deep knowledge about the correlation between source code, target architecture, and compiler passes interdependence, and therefore is not practical to widely implement.

Modern compilers are capable of producing diagnostic information from passes, describing whether an optimization has been performed or missed for a particular reason, and also emitting statistical information about optimization/opportunities which give more insight to users about operations the compiler did or did not perform during the compilation pipeline. Accordingly, the present invention improves upon the current art, and addresses those deficiencies such as in the example described above, by automatically (i.e., with little or no user input) optimizing pass pipelines for a program in static compilation. The techniques described herein utilize the diagnostic and statistical information emitted into a side file during first pipeline passes to re-generate and/or reconfigure the pass pipeline(s) tailored specific to the application or even fine grain loops.

By customizing certain key diagnostics and statistics in compiler passes, this re-generation or reconfiguration of the pass pipeline(s) enables the compiler (and/or linker) to optimize the program more efficiently and reach either a goal of improving performance or shortening the link optimization time. In the previous example, for instance, before exiting the transformation that missed transformation opportunities due to required canonical form not being satisfied, the compiler may report the reason of failure using an optimization remark emitter (ORE).

As an example, loop fusion transformations require loops to be in loop simplify and rotated form. When loops are not in these forms, a message with the corresponding loop is reported in ORE, "Loop is not in simplified form" and "Candidate is not rotated", respectively. In this situation, the compiler may analyze this information and determine that corresponding passes that can form the missing required canonical forms for the loop should be added/inserted prior to the pass that requires them (i.e., the loop will first be transformed into the required canonical forms prior to entering the pass requiring such, and so the requirements of the transformation will be satisfied). In this way, the "optimizer is optimized" to be able to perform its optimization functions on the program more efficiently, which of course significantly improves performance whether the goal be to simply improve compilation performance or shorten the link optimization time.

Further, this technique may be used to generate link time optimization pass pipeline dynamically, including fine tuning a loop pipeline for each hot loops. These mechanisms may also be used as a train and optimized pipeline, by compiling the train step first, then recompiling the code with an optimized pass pipeline.

It should be noted that the following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two (i.e., two, three, four, five, etc.). The term "connection" may include both an indirect "connection" and a direct "connection."

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

It should further be noted that data is increasingly processed through a variety of geographically disbursed computing components, where, for example, a local node may contain a set of data processing components yet remain in remote communication with other portions of the distributed data processing system. Within the context of the present disclosure, source code data may not be locally stored or processed on the user's local computer, but is instead hosted and/or processed (e.g., via distributed compilation) by one or more distributed storage components that are in remote communication with the local computer. This type of data storage may, in some cases, be referred to as "cloud," or "cloud-based" storage.

Accordingly, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as local computing environments and cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
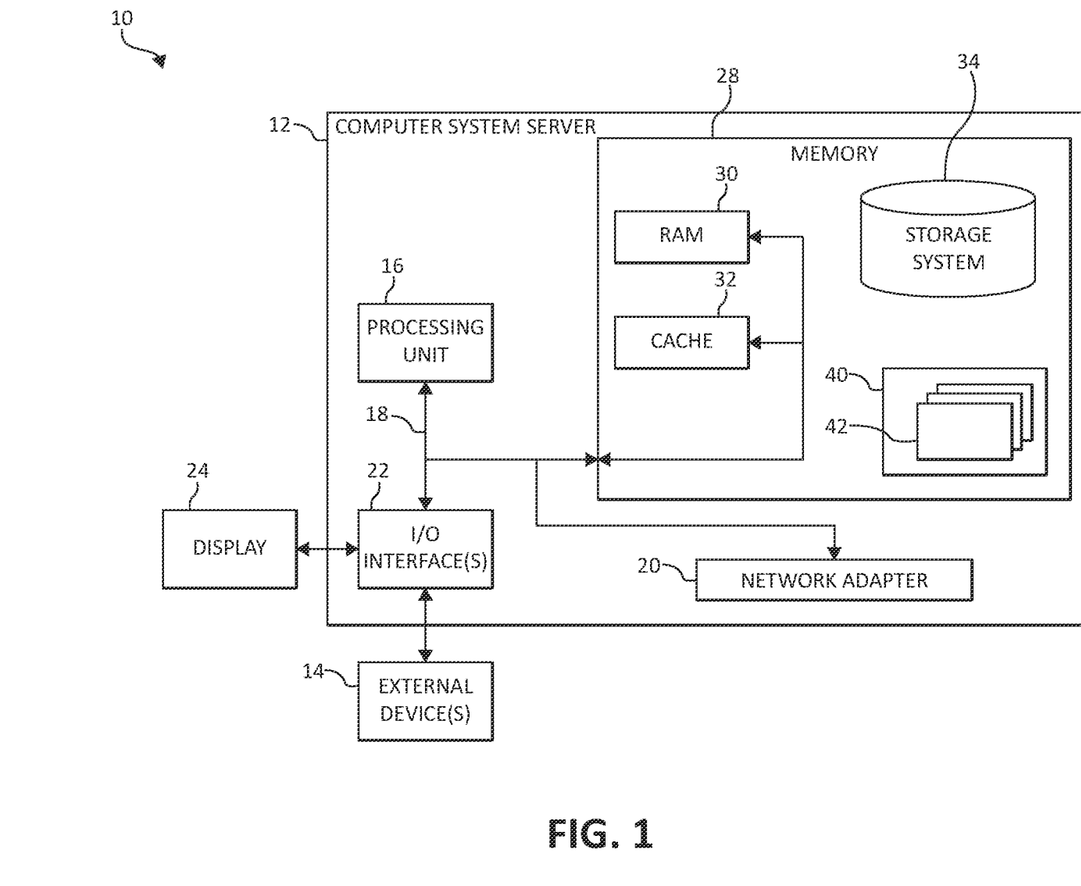
FIG. 1 is a block diagram depicting an exemplary computing node, according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
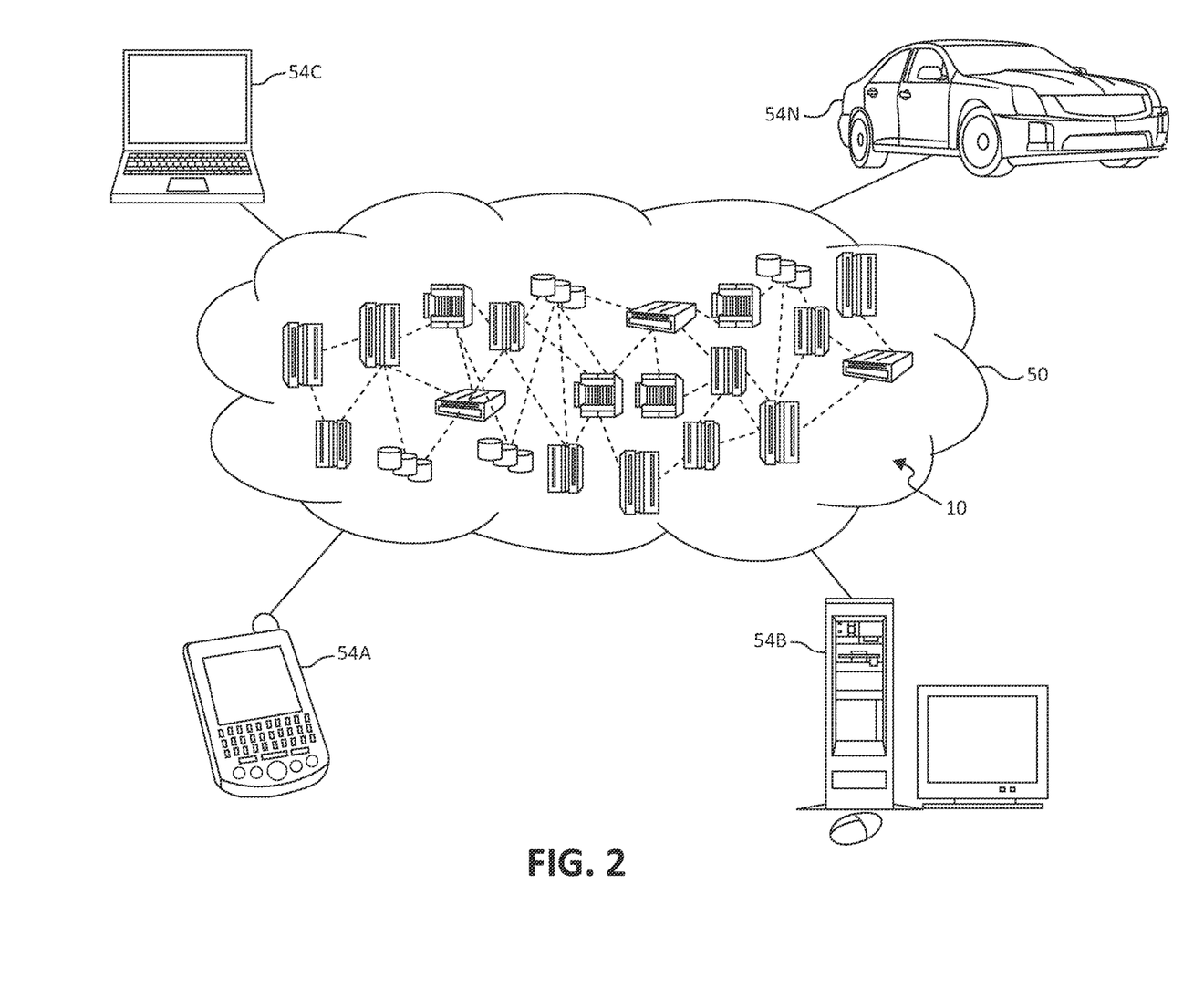
FIG. 2 is a block diagram depicting an exemplary cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
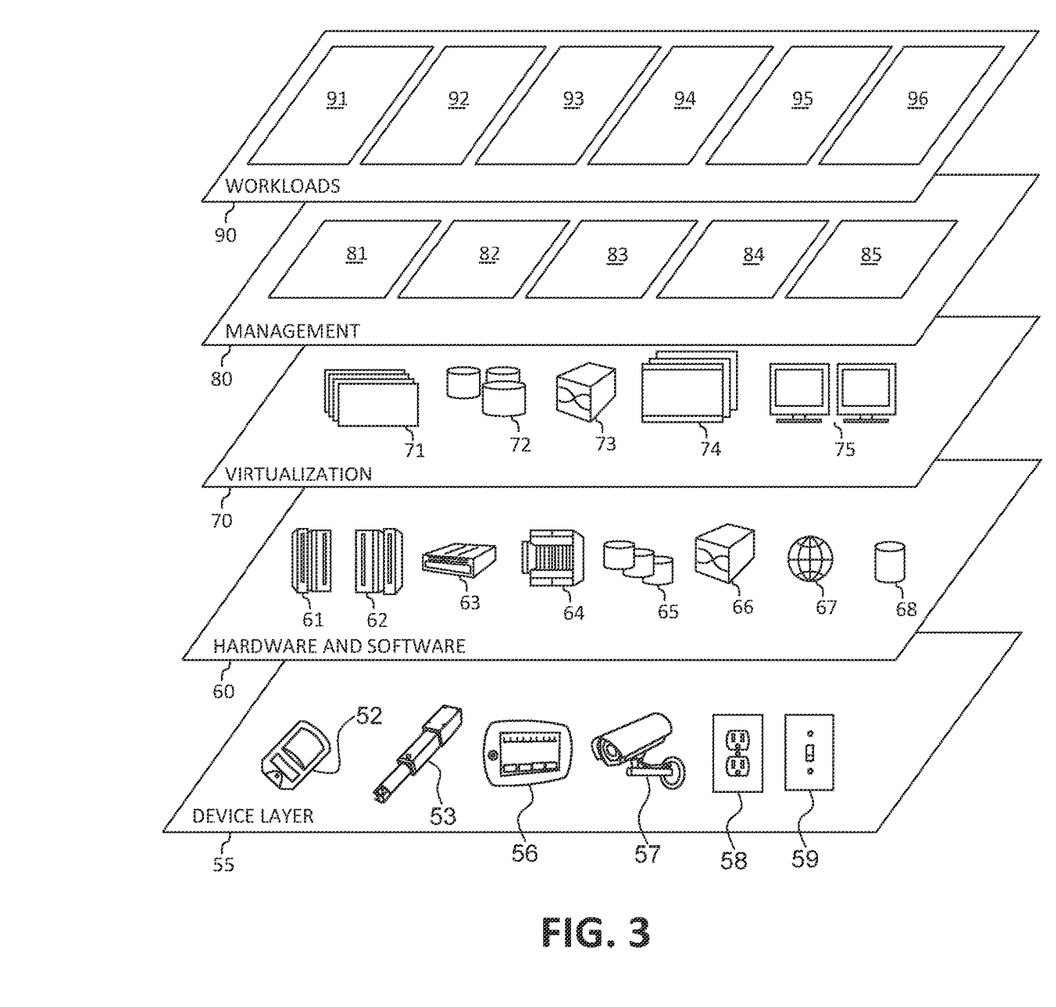
FIG. 3 is a block diagram depicting abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, within the context of the illustrated embodiments of the present invention, various workloads and functions 96 for performing compilation and optimization of computer programs, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
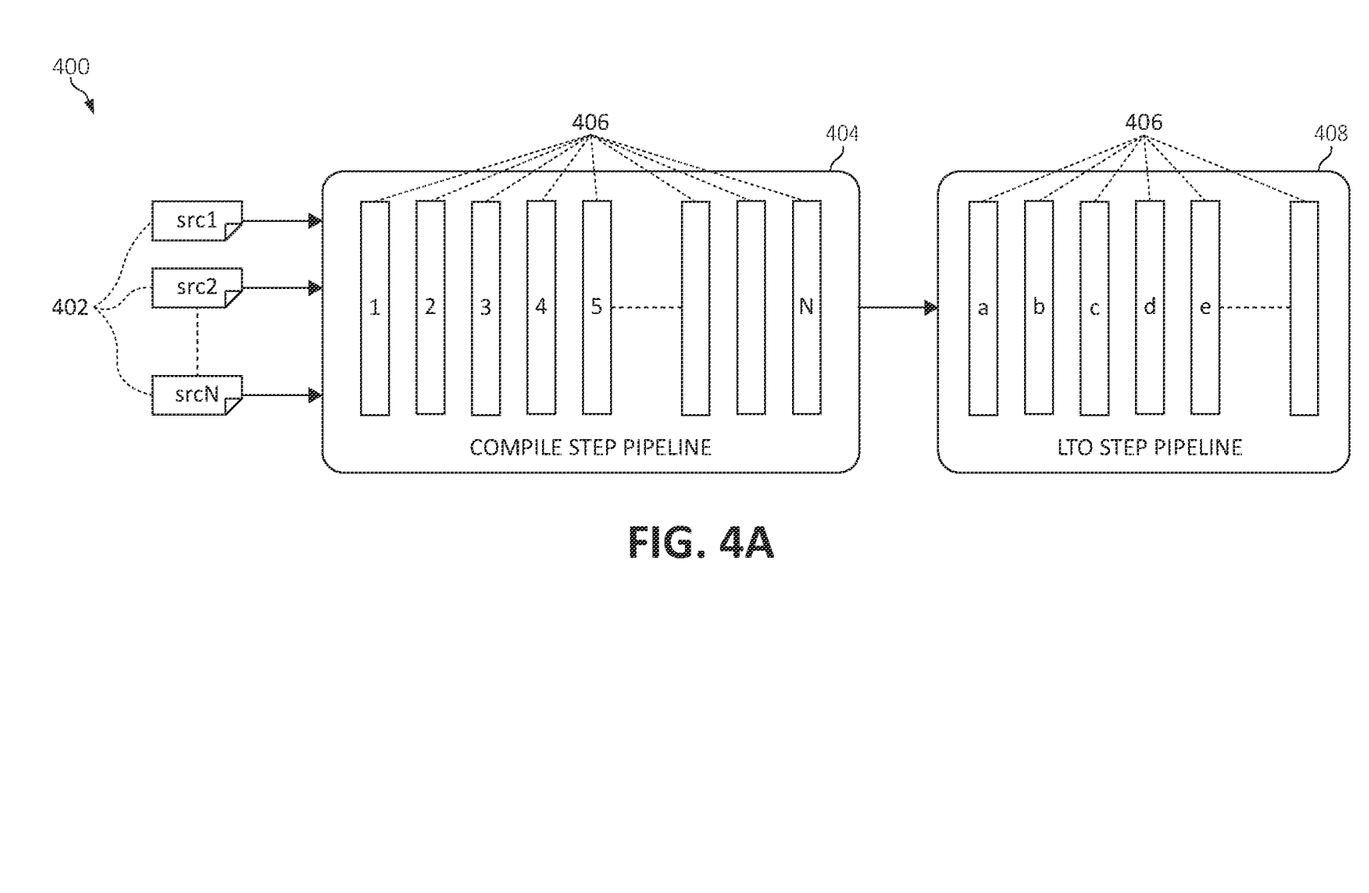
FIGS. 4A and 4B are block diagrams depicting pipelines in a compilation process implementing LTO, according to an embodiment of the present invention.

As previously mentioned, in some embodiments, the mechanisms of the present invention dynamically (i.e., in real-time using dynamic feedback) optimize pass pipelines for a program during static compilation. The techniques described herein utilize diagnostic and statistical information emitted into a side file during first pipeline passes to re-generate and/or reconfigure the pass pipeline(s) tailored specific to the application or even fine grain loops. Turning now to FIG. 4A, typical pipelines of a compilation operation 400 implementing LTO are depicted. The compilation operation 400 is implemented by a compiler (not depicted for brevity), as commonly understood in the art.

Generally, the compiler operates on a source program, stored in system memory 28, having various sets of source input (i.e., source code), collectively referred to as 402. The source input 402 of the source code is received by a parser included in a front end of the compiler in a compile step pipeline 404. In the compile step pipeline 404, the compiler may perform passes 406 which perform a sequence of various transformations on the source input. The compiler's front end converts source input 402 into an IR (a.k.a. intermediate code), and the IR is received by an optimizer included in a back end of the compiler. The optimizer may perform various optimizations using the IR (e.g., LTO) in an LTO step pipeline 408 by similarly performing a sequence of passes 406, Each pass 406 may perform a specific transformation, such as transforming a loop into a certain canonical form per, the example discussed previously. The front end and back end of the compiler may operate as separate passes 406, or the front end may call the back end as a subroutine. It should be noted that, although one can customize the LTO step pipeline 408 when performing the LTO step, the LTO step pipeline 408 is generally fixed for all the input sources 402, and without an understanding of the source code the optimizer is attempting to optimize.

Figure 4B:
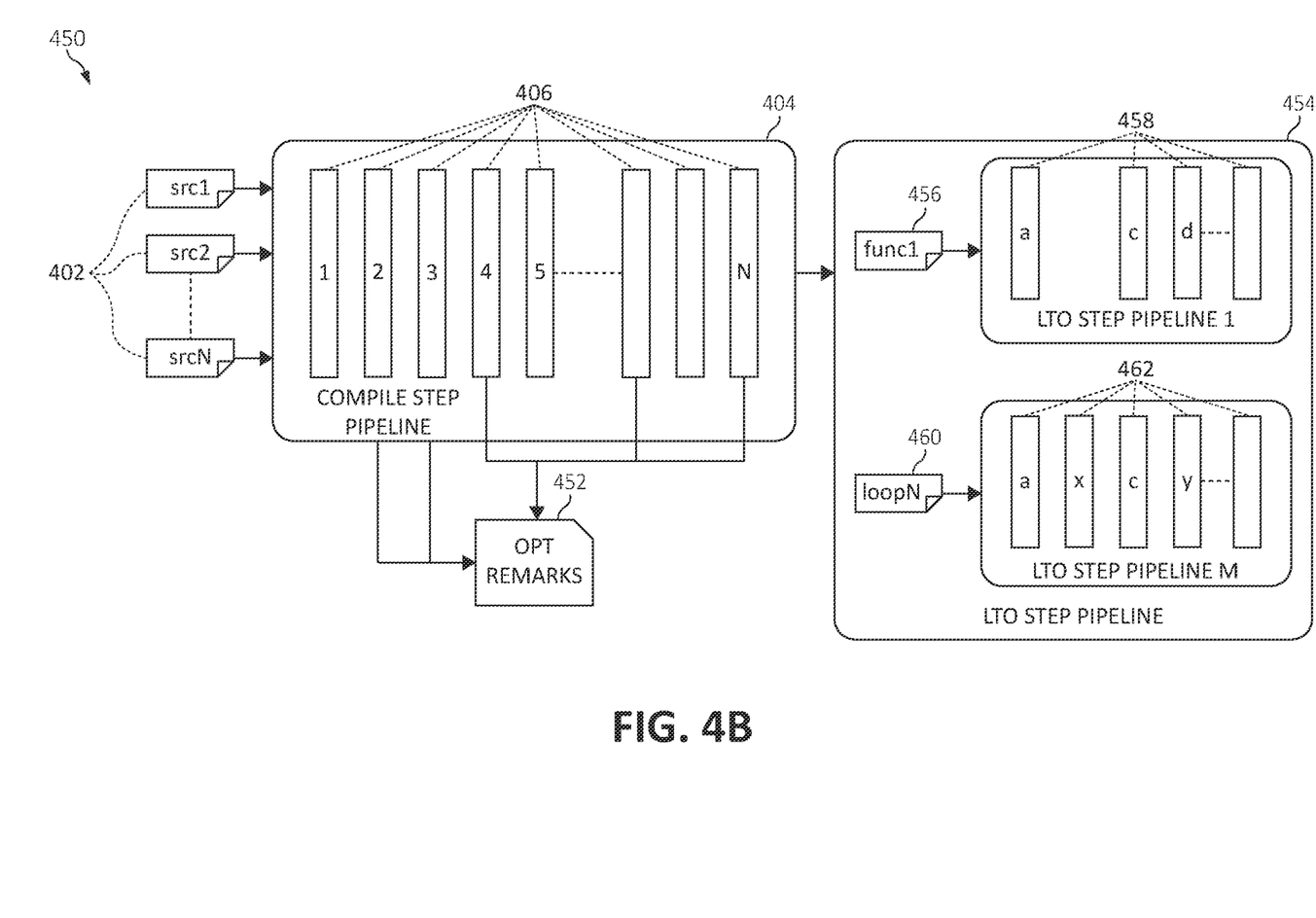

With reference now to FIG. 4B, optimized pipelines of a compilation operation 450 implementing LTO are depicted. In compilation operation 450, the passes 406 in the compile step of the compile step pipeline 404 remain unchanged. However, during the compile step when generating the IR, optimization diagnostics 452 related to information associated with results of the current pass are emitted as remarks into a side file during the operation (e.g., using the ORE). The optimization diagnostics 452, for example and without limitation, may include information such as what callsites have been inlined and what callsites have not been inlined, with remarks signifying a reasoning as to why. In other examples, the optimization diagnostics 452 may include information related to loop vectorization, register pressure and spilling information in register allocation passes, layout information, or information related to failure of loop transformations and corresponding canonical forms, again as discussed previously.

The optimization diagnostics 452 may then be read and analyzed by a control logic of the compiler prior to performing the link step. The control logic may analyze the optimization diagnostics to create analyzed results including instructions. To wit, the control logic receives and reads the remarks of the optimization diagnostics 452 to identify what optimizations or transformations were (or were not) performed during the pass (and if optimizations or transformations failed to be performed, an explanation for the failure), and determines instructions for configuring subsequent pipeline(s) or pass(es) which may more efficiently optimize the code. Aside from the example discussed previously, additional examples of analyzation instructions will follow below.

Upon determining the instructions from the analyzed results from the optimization diagnostics 452 in the side file from compile step pipeline 404, the control logic may generate different pass pipeline(s) or different pass configurations for certain or different groups of the IR during the link step in an optimized LTO step pipeline(s) 454. For example, for a first group of the IR, the control logic may, according to an analyzation of the optimization diagnostics 452, generate a first optimized LTO step pipeline having optimized passes 458 for a function 456. The control logic then, for a second group of the IR, generate a second optimized LTO step pipeline having optimized passes 462 for a loop 460. As depicted in FIG. 4B, the first optimized LTO step pipeline may remove a pass (V) to ensure that successful optimization for function 456 can be performed. Similarly, the second optimized LTO step pipeline may have reordered the optimized passes 462 from their original form in the second optimized LTO pipeline to ensure the most efficient optimization sequence can be performed for loop 460.

It should be noted that the depicted optimized LTO step pipeline(s) 454 is in reference to all optimized LTO step pipelines generated during compilation operation 450. In the illustration in FIG. 4B, the aforementioned first optimized LTO step pipeline with reference to the input of function 456 is labeled "LTO STEP PIPELINE 1" and the aforementioned second LTO step pipeline with reference to the input of the loop 460 is labeled "LTO STEP PIPELINE M". However, these 'first' and 'second' optimized LTO step pipelines are merely provided as examples of the granularity the mechanisms of the present disclosure are able to achieve.

In other words, between LTO step pipeline 1 and M, additional pipeline(s) (i.e., third, fourth, fifth, etc. optimized LTO step pipelines), each having passes specifically ordered to perform optimization of a given input of the IR group, may exist. For example, although not depicted in FIG. 4B, a third optimized LTO step pipeline, having pass ordering specifically generated for an input loop x, may be generated for the input loop x, and a fourth optimized LTO step pipeline, having different pass ordering or pass limits than the third optimized LTO step pipeline, may be generated for an input loop y, and so forth. To wit, any number of pass pipelines having unique pass ordering and/or pass configuration limits may exist dependent upon the source of input from the IR. As a result of generating the unique pipeline(s) in this way, an advantageous component of the present invention is that no recompiling of the program is necessary because the optimization inefficiencies are identified proactively, which in turn leads to improving the functioning of the computer itself by shortening compilation time.

Figure 5:
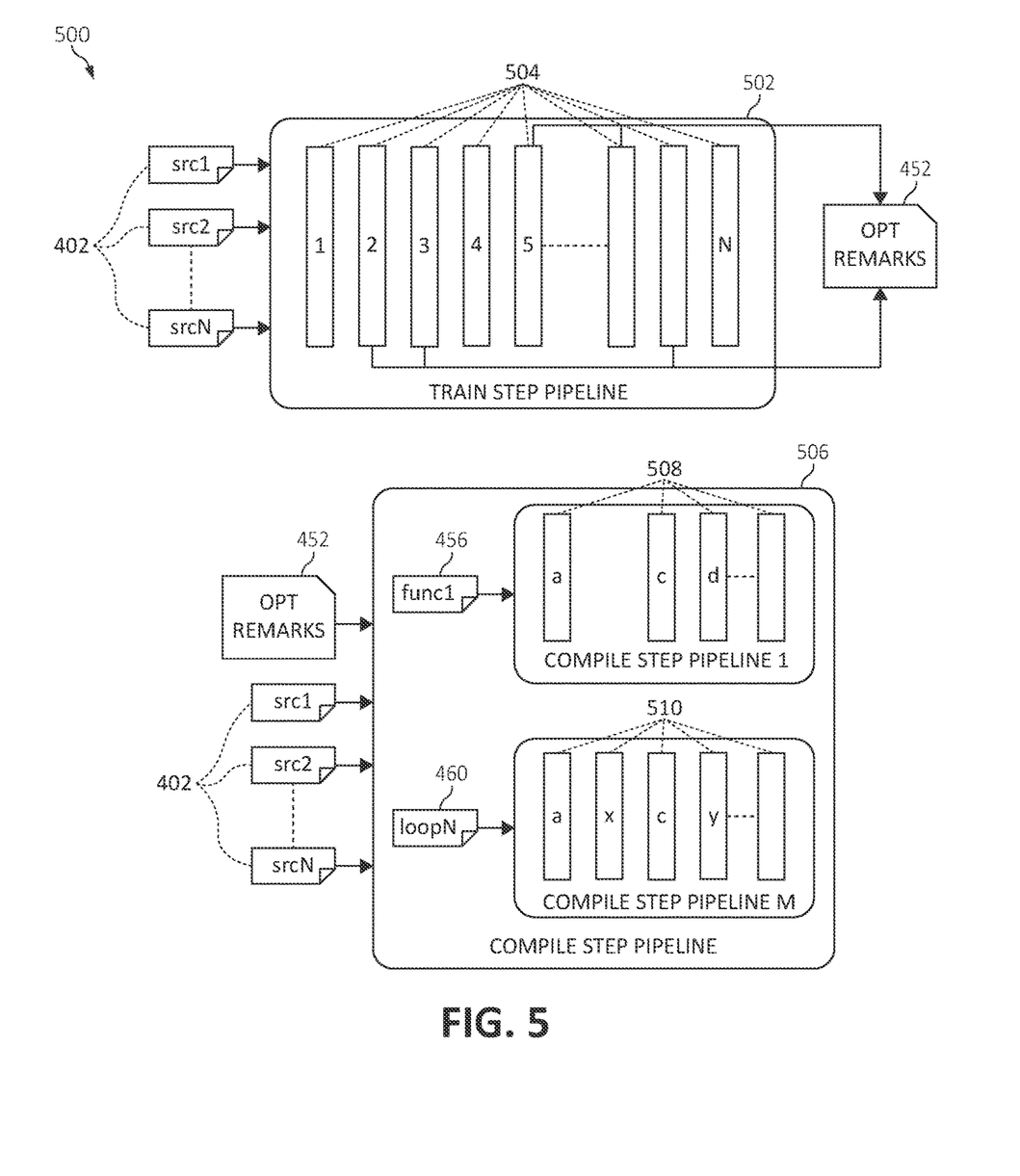
FIG. 5 is a block diagram depicting pipelines in a training and recompile process, according to an embodiment of the present invention.

In another implementation, and referring now to the optimized train and recompile pipelines 500 in FIG. 5, the mechanisms of the present invention may be implemented in an optimized train step pipeline 502 and an optimized compile step pipeline 506 similar to those functions performed in profile guided optimization (PGO). As commonly understood, PGO of a program requires instrumenting (building) the program with special compiler/link flags which insert probes into the generated code, and during a training phase, data is collected providing information when those probes are identified. The data collected from the probes in the training phase is then supplied to the compiler as an input for the optimize phase.

However, to perform the training step in traditional implementations of PGO, runtime profiling is necessary for collecting the data from the probes. The present invention, however, provides alternative and more efficient mechanisms of using compile time feedback as training input, which can be a compromise between training time and performance improvement. This is achieved by using the optimization diagnostics 452 generated as the remarks emitted as feedback during passes 504 of the optimized train step pipeline 502 as input into the recompiling step of the optimized compile step pipeline 506.

Similar to that discussed previously, the optimization diagnostics 452 may be emitted into a side file as remarks upon performing at least one of the passes 504 of the optimized train step pipeline 502 during a train and recompile operation. The control logic may then receive and read the optimization diagnostics 452 to analyze the remarks and determine subsequent instructions. Upon determining the instructions, the control logic may generate different pass pipeline(s) or different pass configurations for certain or different groups of the IR in the optimized compile step pipeline 506. The optimized compile step pipeline 506 of FIG. 5 similarly depicts a first group of the IR in a first optimized compile step pipeline having optimized passes 508 for function 456, and a second group of the IR in a second optimized compile step pipeline having optimized passes 510 for a loop 460. It should be noted that, again in this implementation and unlike traditional PGO, the train step is compile-only with no runtime profiling required. However, the mechanisms of the present invention may also be integrated into traditional PGO optimization steps seamlessly as well.

OPTIMIZATION EXAMPLES

In addition to the example provided previously of transformations not performed due to not being in canonical form, the following optimization examples are provided for consideration of the skilled artisan in implementing the present invention.

Inlining Too Early

In LLVM® Opt, at -O3 LTO PGO, there are 3 invocations of the inlining pass: 1. Inline before collecting profile information; 2. Inline after profile information at the compile step; and 3. Inline at the link step.

The advantage of inlining early is the inlined function contains both the caller and the callee information. With this optimization in function scope, more information is provided for performing the optimization. Conversely, there are also disadvantages of inlining early. First, if callsites are inlined prior to collecting profile information, then the hotness of the callsites is not considered when inlining (i.e., cold callsites can be inlined, which could have negative impact). Similarly, if callsites are inlined at the compile step, incorrect decisions in performing future optimizations may be made due to lack of information.

Figure 6:
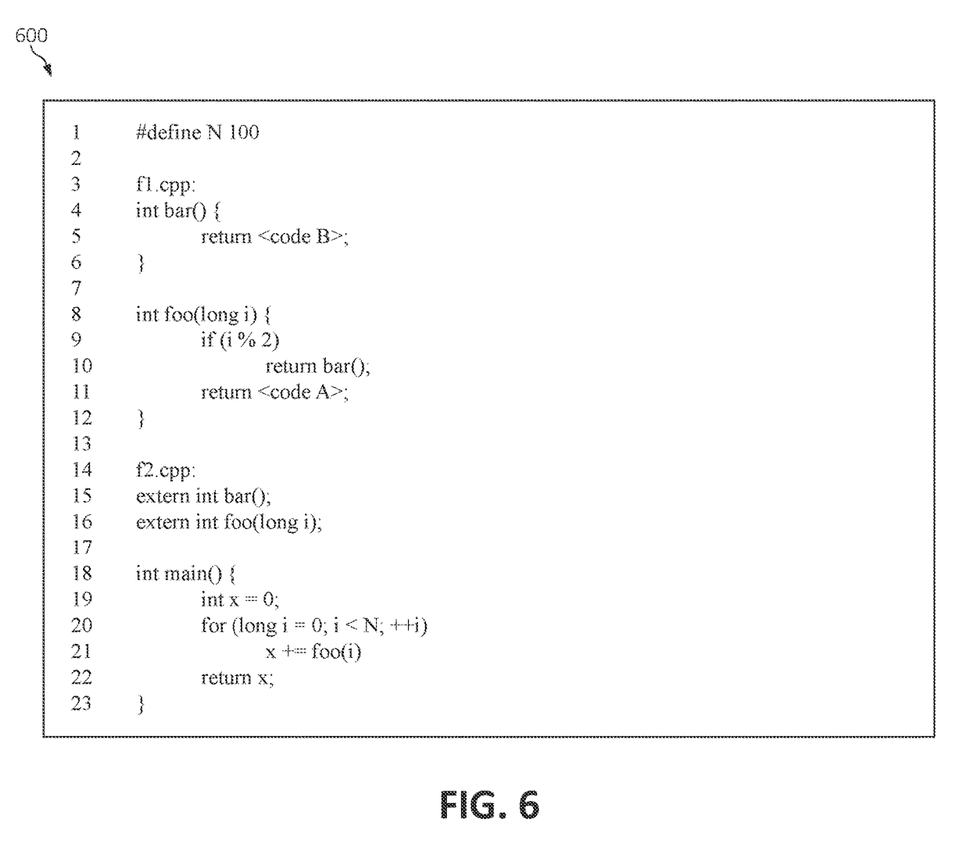
FIG. 6 illustrates an example of code which may be associated with a method for feedback-directed pass pipeline optimization in static compilation, according to an embodiment of the present invention.

As depicted in the example code 600 of FIG. 6, inlining bar( ) into foo( ) could block foo( ) from inlining to main( ) due to the increase in function size of foo( ) from bar( ) In addition, one can see that bar( ) is only invoked half the time of foo( ) due to the instruction in line 9. If inlining before collecting profile, then the inliner would not be informed that the callsite from foo( ) to bar( ) is actually cold. If inlining at compile step, given that bar( ) and foo( ) are in f1.cpp, and main( ) is in f2.cpp, the inliner would not be able to have a view of the whole program, and may make the wrong decision to inline bar( ) into foo( ).

From this example, it is observed that, in this application, is best to only inline under the third invocation of inlining. Each of the inlining passes generates reports on what callsites are inlined, and what callsites are not inlined with the reason why, and this information is generated as the optimization diagnostics 452. Based on the remarks of the optimization diagnostics 452, the control logic may identify callsites that should not be inlined early and generate optimal passes for doing so, while simultaneously maintaining the benefit of inlining early for other callsites.

Aggressive Loop Invariant Code Motion (LICM) Causing Spilling

In LICM, the transformation will hoist instructions out of loop, which will increase the register pressure. Although there are heuristics to estimate the register pressure, the estimation is not accurate enough to avoid spilling. ORE can be implemented to emit, as optimization diagnostics 452, the information about register pressure, the code motion statistics in LICM, and also the real spilling information in the register allocation pass. The control logic may then use this information to adjust the limit of LICM to avoid spilling in the hot loops automatically.

Conservative LoopStrengthReduce (LSR) Causing Too Many Register Copies

Some optimizations such as LSR may abort due to reaching its default limit, hence missing some known opportunities and generating bad code (e.g., creating too many register copies). ORE can emit, as optimization diagnostics 452, the information with respect to LSR reaching the default limit, expression candidates, and register copies in register allocation passes. The control logic may then use the optimization diagnostics 452 to adjust the limit of LSR to avoid too many register copies.

With the previous examples, it is seen that there is no optimal pass ordering that fits all programs, or even functions/loops in a program. Code can be added for specific cases, but practically not generic enough for use in general purposes. With the dynamic pass ordering method of the present invention, the pass ordering or pass limits may be determined and tailored to a specific code as small as a loop.

Figure 7:
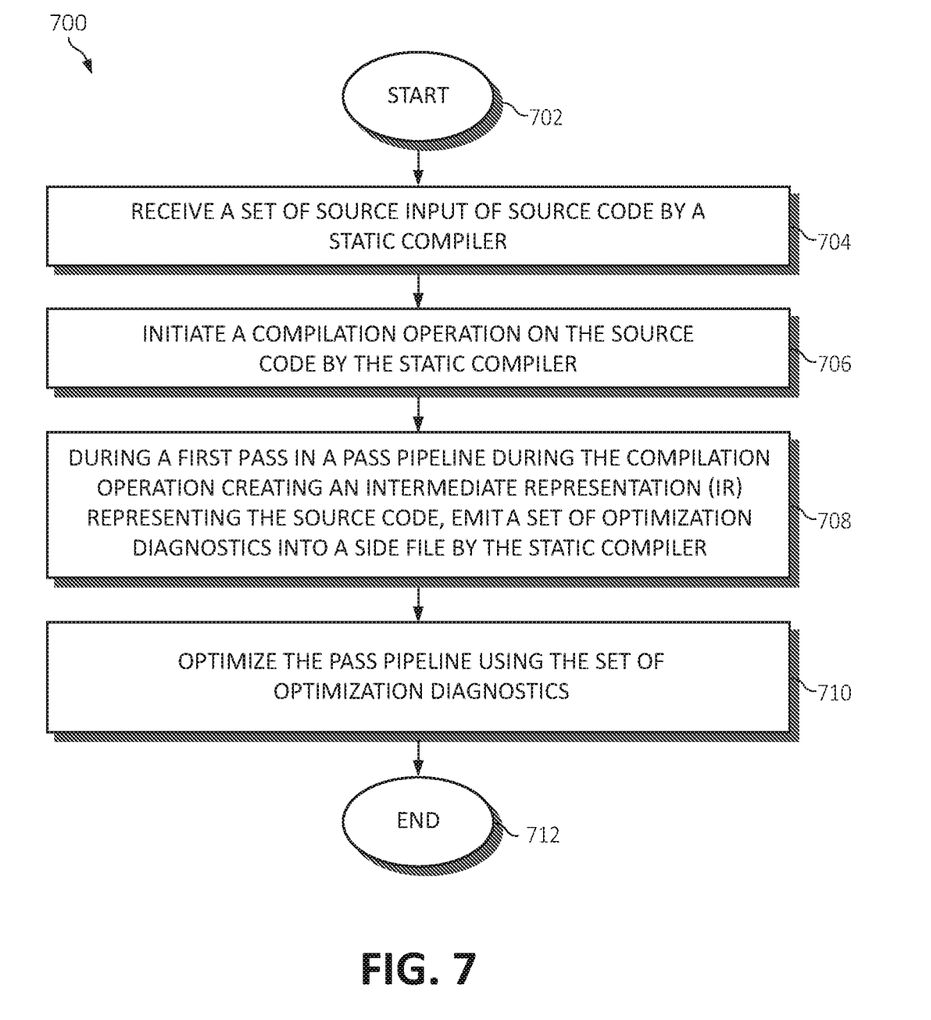
FIG. 7 is a flowchart diagram of an exemplary method for feedback-directed pass pipeline optimization in static compilation, according to an embodiment of the present invention.

Turning to FIG. 7, a flowchart diagram of an exemplary method 700 for feedback-directed pass pipeline optimization in static compilation is provided. The method 700 may be performed by, for example, the computer system/server 12 described in FIG. 1. The method 700 begins (step 702) by receiving a set of source input of source code by a static compiler (step 704). A compilation operation is initiated on the source code by the static compiler (step 706). In a first pipeline during the compilation operation in which an intermediate representation (IR) representing the source code is created, a set of optimization diagnostics identified in a first pass of the first pass pipeline are emitted into a side file by the static compiler (step 708). The pass pipeline is then optimized using the set of optimization diagnostics (step 710), and the method 700 ends (step 712).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer-implemented method for feedback-directed pass pipeline optimization in static compilation, the computer-implemented method, comprising:
   receiving a set of source input of source code by a static compiler;
   initiating a compilation operation on the source code by the static compiler;
   in a pass pipeline during the compilation operation in which an intermediate representation (IR) representing the source code is created, emitting a set of optimization diagnostics identified in a first pass of the pass pipeline into a side file by the static compiler; and
   optimizing the pass pipeline using the set of optimization diagnostics by dynamically adjusting the pass pipeline to resolve transformations of the source code into a canonical form respectively required to perform optimizations on the transformations during the compilation operation by the static compiler.

2. The computer-implemented method of claim 1, wherein the compilation operation comprises a compilation process implementing link time optimization (LTO), the computer-implemented method further comprising:
   receiving the set of optimization diagnostics as remarks in the side file prior to a linking operation of the compilation process; and
   analyzing the remarks using predetermined control logic to create analyzed results.

3. The computer-implemented method of claim 2, further comprising generating, using the analyzed results, at least one of a different pass pipeline and a different pass configuration for different groups of the IR for the compilation process.

4. The computer-implemented method of claim 3, wherein the optimizing of the pass pipeline is accomplished by performing the LTO during the linking operation of the compilation process by one of reordering subsequent passes according to the different pass pipeline and adjusting at least one of subsequent compiling parameters and subsequent linking parameters according to the different pass configuration for the different groups of the IR.

5. The computer-implemented method of claim 1, wherein the compilation operation comprises a training and recompile process, the computer-implemented method further comprising:
   receiving the set of optimization diagnostics as remarks in the side file prior to a recompilation operation of the training and recompile process; and
   analyzing the remarks using predetermined control logic to create analyzed results.

6. The computer-implemented method of claim 5, further comprising generating, using the analyzed results, at least one of a different pass pipeline and a different pass configuration for different groups of the IR for the training and recompile process.

7. The computer-implemented method of claim 6, wherein the optimizing of the pass pipeline is accomplished by performing the recompiling operation of the training and recompile process by one of reordering subsequent passes according to the different pass pipeline and adjusting subsequent compiling parameters according to the different pass configuration for the different groups of the IR.

8. A system for feedback-directed pass pipeline optimization in static compilation, the system comprising:
   a hardware memory; and
   a hardware processor executing instructions stored in the hardware memory; wherein, when executed, the instructions cause the hardware processor to:
      receive a set of source input of source code by a static compiler;
      initiate a compilation operation on the source code by the static compiler;
      in a pass pipeline during the compilation operation in which an intermediate representation (IR) representing the source code is created, emit a set of optimization diagnostics identified in a first pass of the pass pipeline into a side file by the static compiler; and
      optimize the pass pipeline using the set of optimization diagnostics by dynamically adjusting the pass pipeline to resolve transformations of the source code into a canonical form respectively required to perform optimizations on the transformations during the compilation operation by the static compiler.

9. The system of claim 8, wherein the compilation operation comprises a compilation process implementing link time optimization (LTO), and wherein, when executed, the instructions further cause the hardware processor to:
   receive the set of optimization diagnostics as remarks in the side file prior to a linking operation of the compilation process; and
   analyze the remarks using predetermined control logic to create analyzed results.

10. The system of claim 9, wherein, when executed, the instructions further cause the hardware processor to generate, using the analyzed results, at least one of a different pass pipeline and a different pass configuration for different groups of the IR for the compilation process.

11. The system of claim 10, wherein the optimizing of the pass pipeline is accomplished by performing the LTO during the linking operation of the compilation process by one of reordering subsequent passes according to the different pass pipeline and adjusting at least one of subsequent compiling parameters and subsequent linking parameters according to the different pass configuration for the different groups of the IR.

12. The system of claim 8, wherein the compilation operation comprises a training and recompile process, and wherein, when executed, the instructions further cause the hardware processor to:
   receive the set of optimization diagnostics as remarks in the side file prior to a recompilation operation of the training and recompile process; and
   analyze the remarks using predetermined control logic to create analyzed results.

13. The system of claim 12, wherein, when executed, the instructions further cause the hardware processor to generate, using the analyzed results, at least one of a different pass pipeline and a different pass configuration for different groups of the IR for the training and recompile process.

14. The system of claim 13, wherein the optimizing of the pass pipeline is accomplished by performing the recompiling operation of the training and recompile process by one of reordering subsequent passes according to the different pass pipeline and adjusting subsequent compiling parameters according to the different pass configuration for the different groups of the IR.

15. A computer program product for feedback-directed pass pipeline optimization in static compilation, the computer program product comprising a non-transitory computer-readable storage medium having program instructions embodied thereon, the program instructions executable by a processor to cause the processor to:

receive a set of source input of source code by a static compiler;

initiate a compilation operation on the source code by the static compiler;

in a pass pipeline during the compilation operation in which an intermediate representation (IR) representing the source code is created, emit a set of optimization diagnostics identified in a first pass of the pass pipeline into a side file by the static compiler; and optimize at least one of the pass pipeline using the set of optimization diagnostics by dynamically adjusting the pass pipeline to resolve transformations of the source code into a canonical form respectively required to perform optimizations on the transformations during the compilation operation by the static compiler.

16. The computer program product of claim 15, wherein the compilation operation comprises a compilation process implementing link time optimization (LTO), and wherein the program instructions executable by the processor further cause the processor to:

receive the set of optimization diagnostics as remarks in the side file prior to a linking operation of the compilation process; and analyze the remarks using predetermined control logic to create analyzed results.

17. The computer program product of claim 16, wherein the program instructions executable by the processor further cause the processor to generate, using the analyzed results, at least one of a different pass pipeline and a different pass configuration for different groups of the IR for the compilation process.

18. The computer program product of claim 17, wherein the optimizing of the pass pipeline is accomplished by performing the LTO during the linking operation of the compilation process by one of reordering subsequent passes according to the different pass pipeline and adjusting at least one of subsequent compiling parameters and subsequent linking parameters according to the different pass configuration for the different groups of the IR.

19. The computer program product of claim 15, wherein the compilation operation comprises a training and recompile process, and wherein the program instructions executable by the processor further cause the processor to:

receive the set of optimization diagnostics as remarks in the side file prior to a recompilation operation of the training and recompile process; and analyze the remarks using predetermined control logic to create analyzed results.

20. The computer program product of claim 19, wherein the program instructions executable by the processor further cause the processor to generate, using the analyzed results, at least one of a different pass pipeline and a different pass configuration for different groups of the IR for the training and recompile process, wherein the optimizing of the pass pipeline is accomplished by performing the recompiling operation of the training and recompile process by one of reordering subsequent passes according to the different pass pipeline and adjusting subsequent compiling parameters according to the different pass configuration for the different groups of the IR.

* * * * *